United States Patent [19]

Aschwanden

[11] Patent Number: 4,491,870
[45] Date of Patent: Jan. 1, 1985

[54] DIGITAL SYNC SEPARATOR

[75] Inventor: Felix Aschwanden, Thalwil, Switzerland

[73] Assignee: RCA Corporation, New York, N.Y.

[21] Appl. No.: 408,784

[22] Filed: Aug. 17, 1982

[51] Int. Cl.³ .......................... H04N 5/08; H04N 5/10
[52] U.S. Cl. ...................................... 358/153; 358/154
[58] Field of Search ............... 358/153, 154, 148, 149, 358/20, 19; 328/137, 139, 115; 377/55, 86

[56] References Cited

U.S. PATENT DOCUMENTS 3,962,540  6/1976  Kokado ................................ 358/154
4,281,345  7/1981  Wärn .................................... 358/149
4,414,570  11/1983  Braune et al. ....................... 358/154

*Primary Examiner*—Tommy P. Chin
*Assistant Examiner*—Michael D. Parker
*Attorney, Agent, or Firm*—E. M. Whitacre; W. H. Meise; H. I. Steckler

[57] ABSTRACT

A digital sync separator has a separator for supplying composite sync from composite video. A counter counts clock pulses and is reset by the composite sync signals and one of its outputs. The separator can comprise a pair of controlled switches, one switch being a clamp, the other supplying a signal to a low pass filter and attenuator, and a comparator to compare the composite video with the attenuated signal.

5 Claims, 7 Drawing Figures

DIGITAL SYNC SEPARATOR

BACKGROUND OF THE INVENTION

The present invention relates to circuits for separating synchronization (sync) signals from a composite video signal, and more particularly, to such circuits in digital form.

A typical prior art sync separator uses a diode clamp circuit followed by a comparator to separate composite sync from a composite video signal and then one-shots (monostable multivibrators) to separate horizontal and vertical sync and a burst gate from the composite sync signal. While performance of such separators is generally good, it can be improved. For example, the diode clamp circuit is relatively "soft" (clamp level changes with picture content and also during the vertical sync interval) which may cause sync, and hence picture, jitter. Further, the circuits require large numbers of discrete resistors and capacitors that cannot be integrated on an integrated circuit chip.

It is therefore desirable to have a sync separator circuit that can be easily integrated and which has a fixed clamp level.

SUMMARY OF THE INVENTION

Method and apparatus for separating synchronization signals from a composite synchronization signal, comprising counting clock signals, resetting said counting using the logical AND of said composite sync and a divided clock signal starting at least one-half a line duration after the beginning of a line and before the start of a next line, the resetting signal comprising a separated horizontal synchronization signal, and decoding vertical synchronization and color burst gate signals from said composite synchronization signals and the counted clock signals.

DETAILED DESCRIPTION

Figure 1:
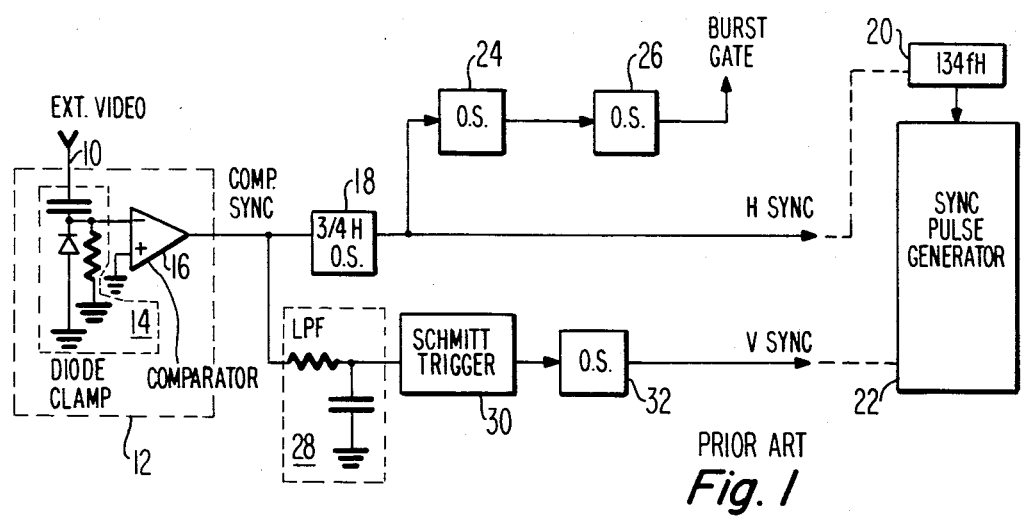
FIG. 1 is a block diagram of a typical prior art sync separator.
Figure 2:
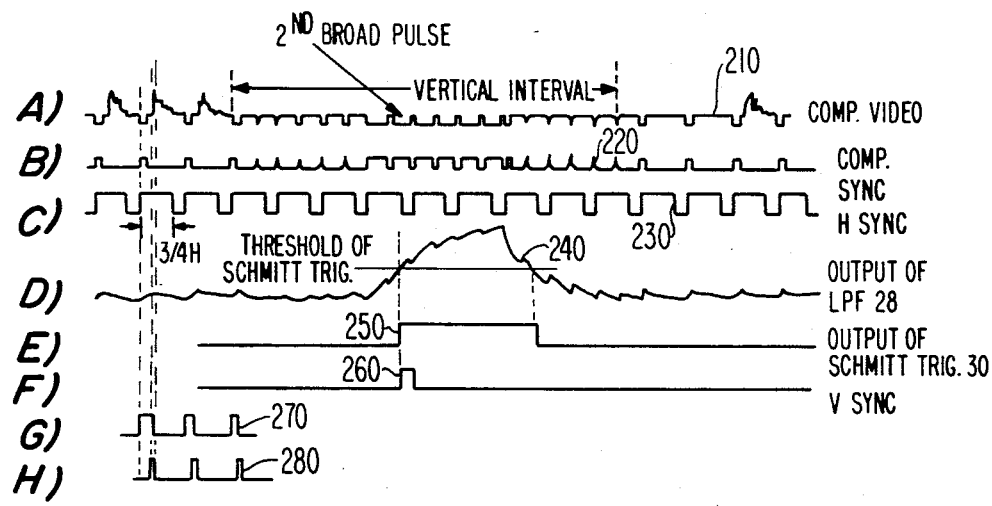
FIG. 2 shows some waveforms present in FIG. 1.

In the prior art circuit of FIG. 1, an external composite video signal shown in FIG. 2A is received at input 10 and applied to an analog separator 12. In separator 12, the composite video signal is first applied to a diode clamp circuit 14 and then to voltage comparator 16. The clamp diode is bypassed by a resistor thereby producing a voltage at the inverting input terminal of comparator 16 which is intermediate the average signal value and the peak signal value. Excursions of the signal about this voltage extending beyond the reference voltage (in this example, the reference is ground) cause the comparator to switch. Thus only those signal components above a selected value are provided at the output of separator 12, these signals being the composite sync signals shown in FIG. 2B, which represent the composite sync video component of the composite input signal.

The composite sync signal is applied to one-shot 18 having an output signal equal to $\frac{3}{4}$ of a line duration. One-shot 18 provides as an output signal a horizontal rate train of $\frac{3}{4}$ H pulses 230, which continue at the horizontal rate during the vertical interval, as shown in FIG. 2C, since multivibrator 18 does not switch during the occurrence of equalizing pulses in its input signal. The leading edge of the $\frac{3}{4}$ H output signal is used as a horizontal sync signal for clock generator 20, which generator 20 provides a 134 $f_H$ clock signal to sync pulse generator 22. Two serially coupled one-shots 24 and 26 having output signals as shown in FIGS. 2G and 2H respectively act upon the H sync received by one-shot 24 to provide a burst gate signal from the output of one-shot 26 useful to gate external burst in order to lock subcarrier to burst. Vertical sync can be obtained by filtering the composite sync signal by LPF (low pass filter) 28, as shown in FIG. 2D. The second broad pulse of vertical sync usually reaches the threshold level of Schmitt trigger 30 which fires another one-shot 32. The output signal of one-shot 32 (shown in FIG. 2E) can be used to reset a vertical counter (not shown) of sync pulse generator 22. The performance of the above-identified prior art circuit is good, but unfortunately the circuit is not suited to be integrated on a digital sync pulse generator chip because of the need of many discrete components. It is desirable to have a sync separator circuit which uses only logic circuits rather than discrete elements, such as resistors or capacitors.

Figure 3:
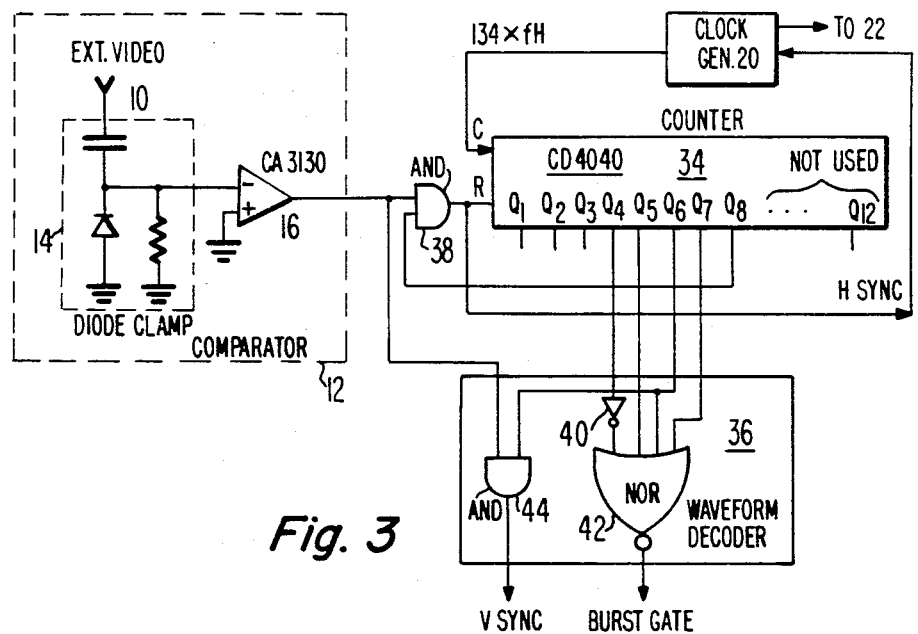
FIG. 3 shows a block diagram of a sync separator in accordance with the invention.

Such a sync separator which uses only logic circuits is shown in FIG. 3. In general, a ripple counter 34 (RCA type CD 4040) counts 128 134-$f_H$ pulses 410 shown in FIG. 4A which are derived from generator 20. When $Q_8$ is high, counter 34 is reset by the next pulse of the following composite sync 220. A waveform decoder 36 provides a burst gate pulse and vertical sync information (V) as will be described.

Assuming the output $Q_8$ of counter 34 is HIGH (at the time $t-1$ in FIG. 4D), the next H sync pulse from separator 12 as shown in FIG. 4B, enables AND gate 38 to produce a HIGH output signal which is applied to the reset input R of counter 34 and resets all its stages. When the counter is reset, $Q_8$ goes low and causes the output of gate 38 to go LOW. Therefore, each reset pulse 430 from gate 38 shown in FIG. 4C becomes very short (approximately 0.3 $\mu$s) and is determined by the propagation delay of the associated circuits.

Counter 34 starts to count 134 $f_H$ clock pulses and $Q_8$ again becomes HIGH 128 pulses later at time $t_3$ in FIG. 4D, which is shortly before the next horizontal sync pulse arrives (compare FIG. 4D with FIG. 4B). As a result, vertical equalizing pulses occurring during the 128 pulse interval cannot affect the counter reset pulse because of the action of gate 38, which gate 38 only produces a HIGH level output if both $Q_8$ and sync are high. Therefore counter 34 and gate 38 perform the same function as $\frac{3}{4}$ H one-shot 18 in FIG. 1. The reset pulse therefore only contains horizontal information.

Figure 4:
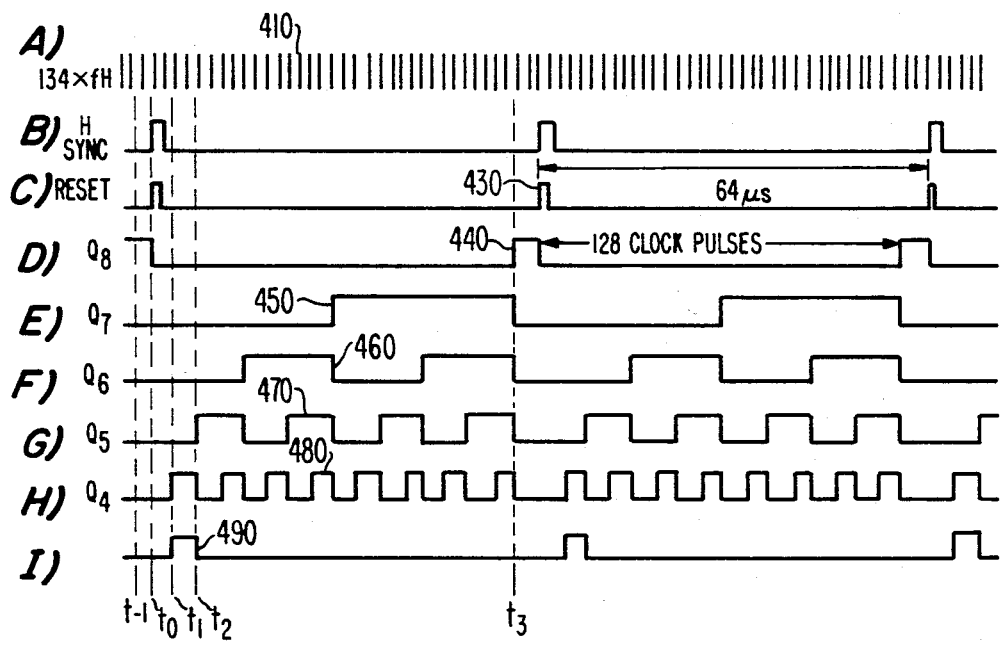
FIGS. 4–6 show some waveforms useful in explaining the operation of FIG. 3.
Figure 5:
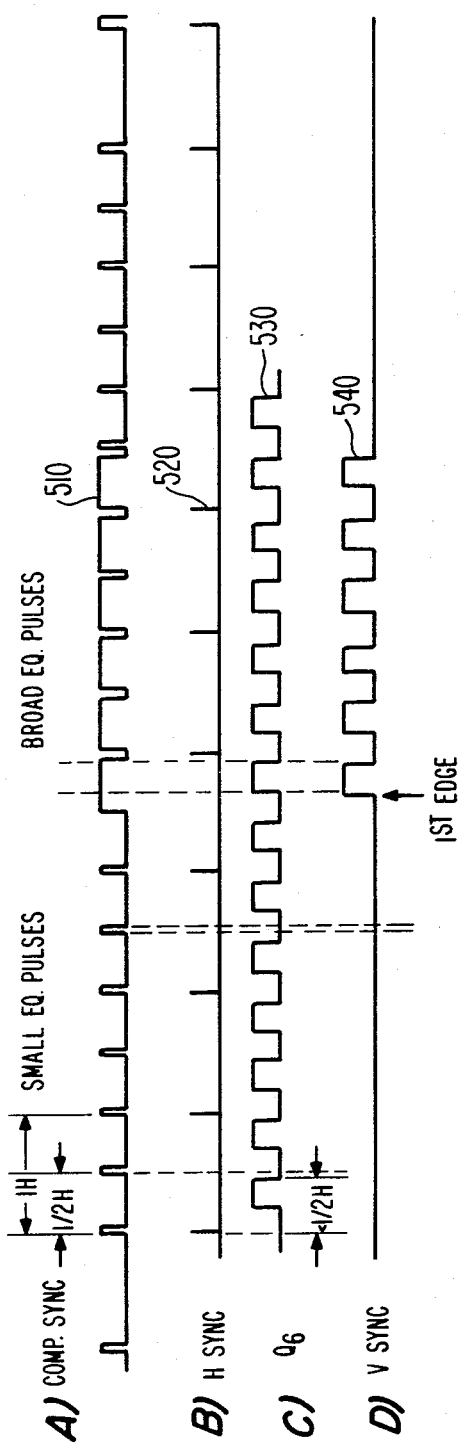

Burst gate information is obtained in decoder 36 by means of inverter 40 and four input NOR gate 42 decoding outputs $Q_4$, $Q_5$, $Q_6$ and $Q_7$ of counter 34. Gate 42 produces a HIGH output signal 490 only if $Q_4$ is HIGH and $Q_5$, $Q_6$ and $Q_7$ are LOW, see FIG. 4I. Signal 490 is HIGH a few clock pulses after H sync, when a burst may be expected. Vertical sync information is obtained in decoder 36 by AND gate 44 receiving composite sync from separator 12 and the signal from the output $Q_6$. FIG. 5A shows the composite sync near the vertical interval of a 525-line system. The duration of a cycle of the signal 530 from output $Q_6$ of FIG. 5C is less than half a line because $Q_6$ is the divided-by-64 output of counter 34 and one half of a horizontal line period is 134/2=67. As a result, $Q_6$ goes low a few microseconds before the middle of each horizontal line and the small equalizing pulses do not produce a V sync signal from gate 44. It can be seen from FIG. 5D (which is obtained by ANDing FIGS. 5A and 5C) that only the broad equalizing pulses produce a V sync pulse train 540. The first edge of the V sync pulse train can be used to vertically lock the sync pulse generator 22. This first edge is in coincidence with the first broad equalizing pulse. Therefore the circuit just described is useful for all TV standards. (Note that 625-line systems only have 5 equalizing pulses).

Figure 6:
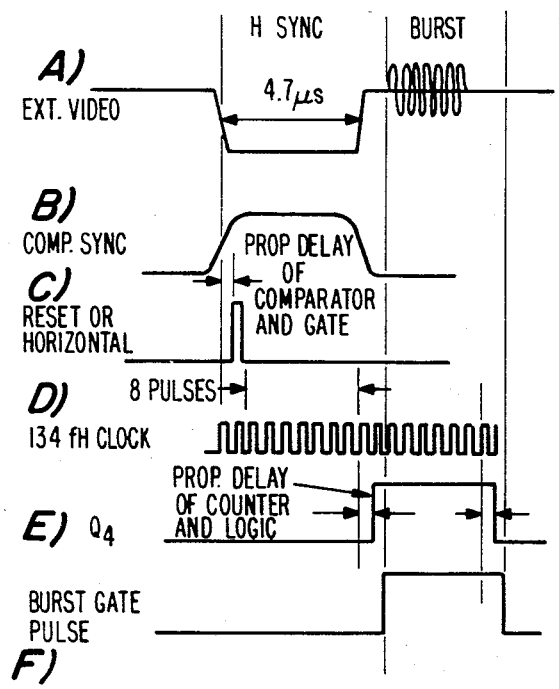

As mentioned above, the circuit does make use of propagation delay. This becomes important in generating the burst gate pulse. The $Q_4$ output shown in FIG. 4H of the counter is LOW for 8 cycles of 134 $f_H$ clock signal 410 and then HIGH for 8 clock cycles. The time duration $t_o - t_1$ of FIG. 4 is $8 \times 0.474$ $\mu s = 3.8$ $\mu s$, which is less than the duration of horizontal sync. It is to be expected that the burst gate pulse starts too early. Fortunately, propagation delay overcomes this problem. FIG. 6F shows the burst gate pulse relative to external video signals of FIG. 6A. The total propagation delay of all associated circuits shown in FIGS. 6B to 6E is approximately 0.8 ... 1.3 $\mu s$ and as a result, the timing of the burst gate pulse is correct.

Figure 7:
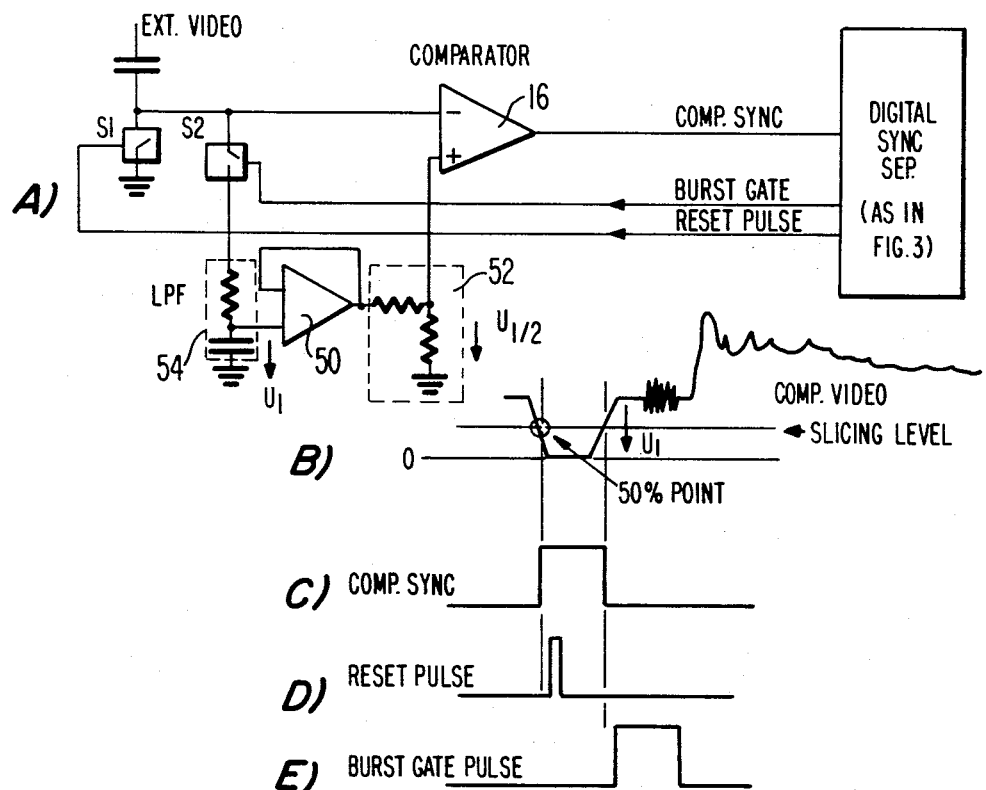
FIG. 7 shows an improved composite sync separator for use with the circuit of FIG. 3 and some associated waveforms.

The diode clamp circuit 14 is not optimum. It is well known that a diode clamp is relatively soft, that is, the clamp level changes slightly with picture content and also during vertical sync. As a result the composite sync output of signal comparator 16 may jitter. This is undesirable and can be improved by using the counter reset pulse of FIG. 7D as a sync tip clamp signal for switch S1 shown in FIG. 7A. As a result, the sync tip always is clamped to ground independent of picture content. The non-inverting input of comparator 16 receives a variable DC signal. This signal is equal to half the sync amplitude and is obtained by sampling the back porch by means of switch S2 and dividing this amplitude in 2 using voltage follower 50 and attenuator 52. The sampling pulse can be the burst gate pulse of FIG. 7E. Note that the burst signal on the back porch of the external video signal in FIG. 7B is a high frequency signal and does not affect the measurement after low pass filtering in LPF 54. The advantage of the circuit in FIG. 7A is that the sync tip always is clamped to ground thereby avoiding jitter and that the slicing level of comparator 16 depends on sync amplitude. As a result the external sync always is sliced at its 50% amplitude point independent of the actual amplitude of the external sync. This results in a very stable time relation between the reset pulse (which depends upon the separated horizontal sync) relative to the 50% point of external sync, which does not change if the amplitude of the external video varies.

What is claimed is:

1. A method for separating television synchronization signals from a composite synchronization signal, said method comprising counting clock signals, resetting said counting using the logical AND of said composite sync and a counted clock signal starting at least one-half a line duration after the beginning of a line and before the start of a next line, the resetting signal comprising a separated horizontal synchronization signal, and decoding vertical synchronization and color burst gate signals from said composite synchronization signals and the counted clock signals.

2. Apparatus for separating television synchronization signals from a composite synchronization signal, said apparatus comprising a source of clock signals, counting means coupled to said clock signal source for providing counted clock signals, an AND gate having a pair of inputs coupled to receive said composite synchronization signal and one of said counted clock signals starting at least one-half a line duration after the beginning of a line and before the start of a next line respectively and an output for providing a resetting signal to said counting means, said resetting signal comprising a separated horizontal synchronization signal, and decoding means coupled to said counting means and said composite synchronization signal for decoding vertical synchronization and color burst gate signals from said composite synchronization signal and the counted clock signals.

3. Apparatus as claimed in claim 2, further comprising separating means having first and second switches, each switch having a signal input means for receiving a composite video signal, a control signal input coupled to said output of said AND gate and said decoding means respectvely, and an output, said first switch output being coupled to a reference potential; providing means coupled to said second switch output for providing a signal equal to a selected proportion of the amplitude of said composite synchronization signal; a comparator having a first input means for receiving said composite video signal, a second input means coupled to said providing means, and an output means coupled to said counting means for supplying said composite synchronization signal.

4. Apparatus as claimed in claim 3, wherein said providing means comprises a low pass filter coupled to said second switch output, and an attenuator coupled to said low pass filter and said comparator second input means.

5. Apparatus as claimed in claim 3, wherein said selected proportion comprises one half.

* * * * *